US012601158B2

(12) United States Patent
Atkinson et al.

(10) Patent No.: US 12,601,158 B2
(45) Date of Patent: Apr. 14, 2026

(54) METHODS FOR TRACKING GROUND ENGAGING TOOLS BETWEEN AND WITHIN IMAGE FRAMES

(71) Applicant: Caterpillar Inc., Peoria, IL (US)

(72) Inventors: John Paul Atkinson, Pittsburgh, PA (US); Norman Keith Lay, Baden, PA (US); Shawn Mathew, Savoy, IL (US); Darren Harton, Glenshaw, PA (US); David Robinson, Napier (NZ); Dylan Arrabito, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 112 days.

(21) Appl. No.: 18/401,280

(22) Filed: Dec. 29, 2023

(65) Prior Publication Data

US 2025/0215669 A1 Jul. 3, 2025

(51) Int. Cl.
| | |
|---|---|
| *E02F 9/26* | (2006.01) |
| *G06T 7/11* | (2017.01) |
| *G06T 7/50* | (2017.01) |
| *G06T 7/66* | (2017.01) |
| *G06V 10/26* | (2022.01) |
| *G06V 10/74* | (2022.01) |
| *G06V 10/82* | (2022.01) |
| *G06V 20/56* | (2022.01) |

(52) U.S. Cl.
CPC ............... *E02F 9/267* (2013.01); *G06T 7/11* (2017.01); *G06T 7/50* (2017.01); *G06T 7/66* (2017.01); *G06V 10/26* (2022.01); *G06V 10/761* (2022.01); *G06V 10/82* (2022.01);
*G06V 20/56* (2022.01); *G06T 2207/20084* (2013.01); *G06T 2207/30252* (2013.01)

(58) Field of Classification Search
CPC ... E02F 9/267; G06T 7/50; G06T 7/11; G06T 7/66; G06T 2207/20084; G06T 2207/30252; G06V 10/761; G06V 10/82; G06V 10/26; G06V 20/56
See application file for complete search history.

(56) References Cited

U.S. PATENT DOCUMENTS

| | | | |
|---|---|---|---|
| 8,411,930 | B2 | 4/2013 | Ridley et al. |
| 9,880,075 | B2 | 1/2018 | Finch et al. |
| 10,249,060 | B2 | 4/2019 | Wagner et al. |

(Continued)

FOREIGN PATENT DOCUMENTS

| | | |
|---|---|---|
| CN | 107862675 A | 3/2018 |
| CN | 108055449 A | 5/2018 |

(Continued)

*Primary Examiner* — Peter D Nolan
*Assistant Examiner* — Mikko Okechukwu Obioha

(57) ABSTRACT

A technique is directed to methods and systems for ground engaging tool (GET) loss detection. A GET monitoring system can receive image data from one or more cameras mounted on a machine. The image data can include image frames that include one or more GETs, such as bucket tips, lip shrouds, and/or side shrouds. The GET monitoring system can utilize a neural network to determine whether a GET is missing based on comparing consecutive images, depth measurements from the camera, or the distance relationships between multiple GETs. If a GET is determined to be missing from a bucket, the GET monitoring system can generate a notification to alert the operator or personnel at the site.

20 Claims, 13 Drawing Sheets

(56) References Cited

U.S. PATENT DOCUMENTS

| | | | |
|---|---|---|---|
| 10,339,667 B2 | 7/2019 | Tafazoli Bilandi et al. | |
| 10,689,830 B2 | 6/2020 | Hageman et al. | |
| 11,138,718 B2 | 10/2021 | Campomanes et al. | |
| 11,377,824 B2 | 7/2022 | Yamashita et al. | |
| 2014/0200863 A1 | 7/2014 | Kamat et al. | |
| 2017/0287124 A1* | 10/2017 | Lim | G06T 7/74 |
| 2020/0362539 A1 | 11/2020 | Plouzek et al. | |
| 2020/0393303 A1* | 12/2020 | Betournay | E02F 9/26 |
| 2021/0156121 A1 | 5/2021 | Hayakawa et al. | |
| 2021/0262204 A1 | 8/2021 | Tafazoli Bilandi et al. | |
| 2022/0018098 A1 | 1/2022 | Nakagi et al. | |
| 2022/0136217 A1 | 5/2022 | Petrany et al. | |
| 2022/0307234 A1* | 9/2022 | Hillier | G06V 10/143 |
| 2023/0349133 A1* | 11/2023 | Snyder | E02F 9/2808 |
| 2023/0351581 A1 | 11/2023 | Jenson et al. | |
| 2023/0401689 A1* | 12/2023 | Farthing | G06T 7/70 |
| 2024/0057504 A1* | 2/2024 | Glovier | A01B 79/005 |
| 2024/0172582 A1* | 5/2024 | Kuhn | A01B 79/005 |

FOREIGN PATENT DOCUMENTS

| | | | |
|---|---|---|---|
| CN | 112686206 A | 4/2021 | |
| CN | 114820451 A | 7/2022 | |
| JP | 2021127601 A | 9/2021 | |
| WO | 2020237324 A1 | 3/2020 | |
| WO | 202287661 A1 | 5/2022 | |
| WO | 2023037344 A1 | 3/2023 | |

* cited by examiner

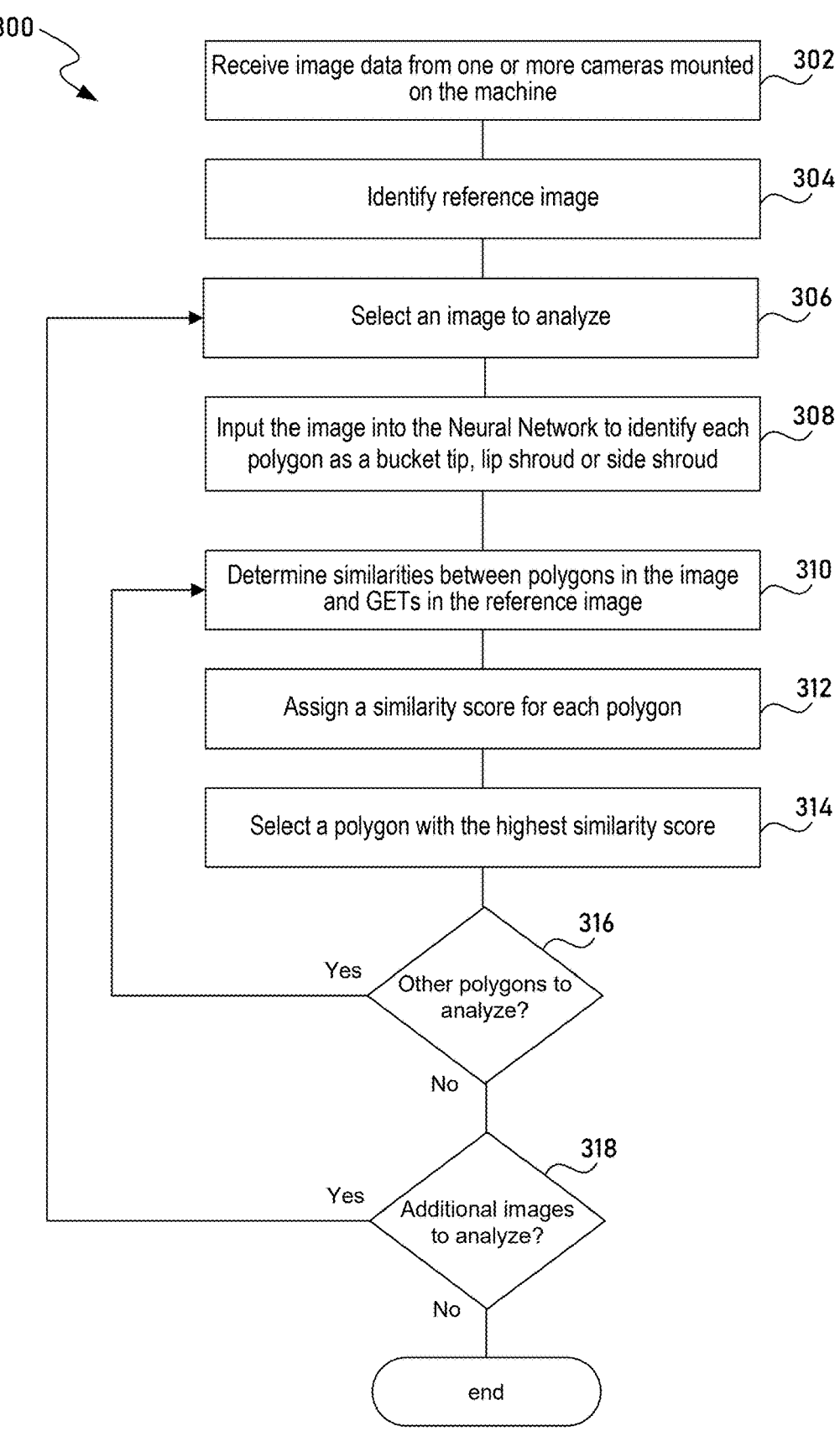

300

Receive image data from one or more cameras mounted on the machine — 302

Identify reference image — 304

Select an image to analyze — 306

Input the image into the Neural Network to identify each polygon as a bucket tip, lip shroud or side shroud — 308

Determine similarities between polygons in the image and GETs in the reference image — 310

Assign a similarity score for each polygon — 312

Select a polygon with the highest similarity score — 314

Other polygons to analyze? — 316
Yes
No

Additional images to analyze? — 318
Yes
No end

During calibration, record the XYZ range in which each GET appears — 402

Receive an image and input the image into the Neural Network — 404

Calculate the centroid of each GET detected by the neural network — 406

Assign GET IDs using pre-determined XYZ ranges — 408

Other polygons to analyze? — 410
Yes
No

Other images to analyze? — 412
Yes
No end

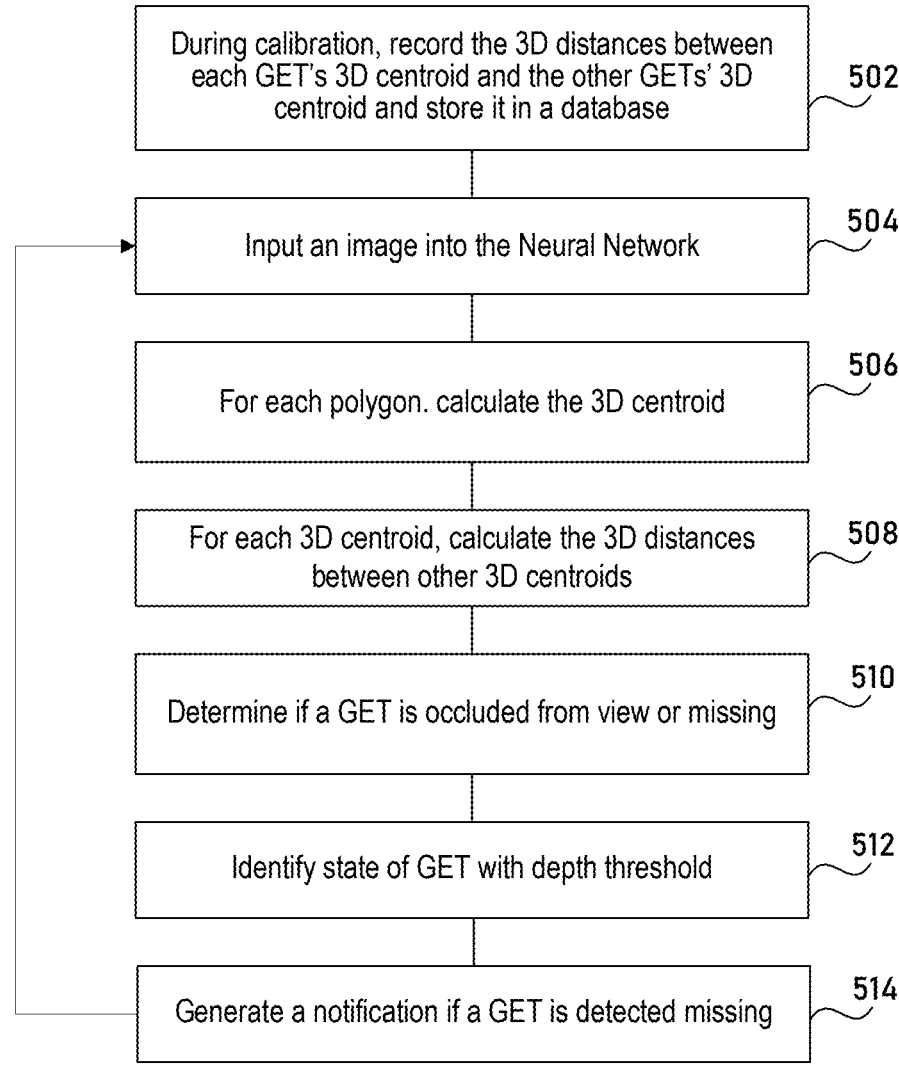

500

| | |
|---|---|
| During calibration, record the 3D distances between each GET's 3D centroid and the other GETs' 3D centroid and store it in a database | 502 |
| Input an image into the Neural Network | 504 |
| For each polygon. calculate the 3D centroid | 506 |
| For each 3D centroid, calculate the 3D distances between other 3D centroids | 508 |
| Determine if a GET is occluded from view or missing | 510 |
| Identify state of GET with depth threshold | 512 |
| Generate a notification if a GET is detected missing | 514 |

METHODS FOR TRACKING GROUND ENGAGING TOOLS BETWEEN AND WITHIN IMAGE FRAMES

TECHNICAL FIELD

This patent application is directed to machine maintenance, and more specifically, to machine part loss detection.

BACKGROUND

As equipment is used, certain parts progressively wear out and break. This wear at some point starts to degrade performance of the equipment such that it is economically preferable to replace the parts. For example, worn ground engaging tools (e.g., excavator teeth of a bucket) lead to higher fuel consumption, lower productivity, and excess wear to other components.

Identifying the loss of a ground engaging tool during operation can be challenging. For example, detecting when a ground engaging tool breaks and falls off the bucket of the machine is a difficult task. In some cases, a broken ground engaging tool that has fallen off a machine can cause damage to other machines at a site, such as a crusher machine. Thus, there is a need to accurately detect when a ground engaging tool is missing from a bucket. Companies have implemented various techniques to solve this problem. In a first example, Patent Publication No. WO2022087661A1 describes a method for generating a three-dimensional heat map to identify a worn or lost ground engaging tool. However, this method does not describe modeling the relationship between ground engaging tools on a bucket. In a second example, Patent Publication No. WO2020237324A1 describes a method for generating a three-dimensional model of a tool to compare to previous versions to identify worn or lost tool parts. However, this method does not describe modeling the relationship between ground engaging tools on a bucket. Thus, there are still opportunities to improve loss detection of ground engaging tools. The example systems and methods described herein are directed toward overcoming one or more of the deficiencies described above.

SUMMARY

In some aspects, the techniques described herein relate to a method for ground engaging tool loss detection, the method including: receiving, from at least one camera, at least one image of a first ground engaging tool and a second ground engaging tool attached to a machine; generating a first segmentation mask around the first ground engaging tool and a second segmentation mask around the second ground engaging tool in the at least one image; determining a first centroid of the first segmentation mask and a second centroid of the second segmentation mask; calculating a distance from the first centroid of the first ground engaging tool to the second centroid of the second ground engaging tool; and in response to the distance not equaling a predetermined value, determining the second ground engaging tool is missing on the machine. In some aspects, the techniques described herein relate to a method, further including: generating a notification that the second ground engaging tool is missing, wherein the notification alerts an operator of the machine to power down the machine.

In some aspects, the techniques described herein relate to a method, further including: receiving, from the at least one camera, a plurality of image frames that include the first ground engaging tool; determining at least one similarity in two or more of the plurality of image frames; and assigning a similarity score based on a measurement of how much at least one detection of the first ground engaging tool in one frame overlaps with at least one detection of the first ground engaging tool in two or more previous frames, wherein the at least one camera is an infrared camera, a stereo depth camera, or a visible color imager, wherein the similarity score is used to identify the first ground engaging tool.

In some aspects, the techniques described herein relate to a method, further including: training a neural network model to detect occluded ground engaging tools in images based on a plurality of images that include annotated occluded ground engaging tools; inputting the at least one image into the trained neural network model; and determining a third ground engaging tool is occluded from the at least one image. In some aspects, the techniques described herein relate to a method, further including: determining the second ground engaging tool is occluded from the at least one image based on a depth metric associated with the second ground engaging tool being below a threshold. In some aspects, the techniques described herein relate to a method, further including: determining the second ground engaging tool is missing from the at least one image based on a depth metric associated with the second ground engaging tool being above a threshold.

In some aspects, the techniques described herein relate to a method, further including: recording a first XYZ range in which the first ground engaging tool appears relative to one or more ground engaging tools in the at least one image; inputting a second image into a neural network model; calculating at least one centroid for at least one ground engaging tool detected by the neural network model in the second image; and identifying the at least one ground engaging tool as the first ground engaging tool based on a second XYZ range from the at least one centroid one or more ground engaging tools in the second image matching the first XYZ range associated with the first ground engaging tool. In some aspects, the techniques described herein relate to a method, further including: identifying the first ground engaging tool in the at least one image based on a column of pixel space the first ground engaging tool is in.

In some aspects, the techniques described herein relate to a non-transitory computer-readable medium storing instructions that, when executed by a computing system, cause the computing system to perform operations for ground engaging tool loss detection, the operations including: receiving, from at least one camera, at least one image of a first ground engaging tool and a second ground engaging tool attached to a machine; generating a first segmentation mask around the first ground engaging tool and a second segmentation mask around the second ground engaging tool in the at least one image; determining a first centroid of the first segmentation mask and a second centroid of the second segmentation mask; calculating a distance from the first centroid of the first ground engaging tool to the second centroid of the second ground engaging tool; and in response to the distance not equaling a predetermined value, determining the second ground engaging tool is missing on the machine.

In some aspects, the techniques described herein relate to a non-transitory computer-readable medium, wherein the operations further include: generating a notification that the second ground engaging tool is missing, wherein the notification alerts an operator of the machine to power down the machine. In some aspects, the techniques described herein relate to a non-transitory computer-readable medium, wherein the operations further include: receiving, from the at least one camera, a plurality of image frames that include the first ground engaging tool; determining at least one similarity in two or more of the plurality of image frames; and assigning a similarity score based on a measurement of how much at least one detection of the first ground engaging tool in one frame overlaps with at least one detection of the first ground engaging tool in two or more previous frames, wherein the at least one camera is an infrared camera, a stereo depth camera, or a visible color imager.

In some aspects, the techniques described herein relate to a non-transitory computer-readable medium, wherein the operations further include: training a neural network model to detect occluded ground engaging tools in images based on a plurality of images that include annotated occluded ground engaging tools; inputting the at least one image into the trained neural network model; and determining a third ground engaging tool is occluded from the at least one image.

In some aspects, the techniques described herein relate to a non-transitory computer-readable medium, wherein the operations further include: determining the second ground engaging tool is occluded from the at least one image based on a depth metric associated with the second ground engaging tool being below a threshold. In some aspects, the techniques described herein relate to a non-transitory computer-readable medium, wherein the operations further include: determining the second ground engaging tool is occluded from the at least one image based on a depth metric associated with the second ground engaging tool being below a threshold.

In some aspects, the techniques described herein relate to a non-transitory computer-readable medium, wherein the operations further include: recording a first XYZ range in which the first ground engaging tool appears relative to one or more ground engaging tools in the at least one image; inputting a second image into a neural network model; calculating at least one centroid for at least one ground engaging tool detected by the neural network model in the second image; and identifying the at least one ground engaging tool as the first ground engaging tool based on a second XYZ range from the at least one centroid to other ground engaging tools in the second image matching the first XYZ range associated with the first ground engaging tool.

In some aspects, the techniques described herein relate to a system including: one or more processors; and one or more memories storing instructions that, when executed by the one or more processors, cause the system to perform a process for ground engaging tool loss detection, the process including: receiving, from at least one camera, at least one image of a first ground engaging tool and a second ground engaging tool attached to a machine; generating a first segmentation mask around the first ground engaging tool and a second segmentation mask around the second ground engaging tool in the at least one image; determining a first centroid of the first segmentation mask and a second centroid of the second segmentation mask; calculating a distance from the first centroid of the first ground engaging tool to the second centroid of the second ground engaging tool; and in response to the distance not equaling a predetermined value, determining the second ground engaging tool is missing on the machine.

In some aspects, the techniques described herein relate to a system, wherein the process further includes: generating a notification that the second ground engaging tool is missing, wherein the notification alerts an operator of the machine to power down the machine. In some aspects, the techniques described herein relate to a system, wherein the process further includes: receiving, from the at least one camera, a plurality of image frames that include the first ground engaging tool; determining at least one similarity in two or more of the plurality of image frames; and assigning a similarity score based on a measurement of how much at least one detection of the first ground engaging tool in one frame overlaps with at least one detection of the first ground engaging tool in two or more previous frames, wherein the at least one camera is an infrared camera, a stereo depth camera, or a visible color imager.

In some aspects, the techniques described herein relate to a system, wherein the process further includes: training a neural network model to detect occluded ground engaging tools in images based on a plurality of images that include annotated occluded ground engaging tools; inputting the at least one image into the trained neural network model; and determining a third ground engaging tool is occluded from the at least one image. In some aspects, the techniques described herein relate to a system, wherein the process further includes: determining the second ground engaging tool is occluded from the at least one image based on a depth metric associated with the second ground engaging tool being below a threshold.

BRIEF DESCRIPTION OF THE DRAWINGS

The systems and methods described herein may be better understood by referring to the following Detailed Description in conjunction with the accompanying drawings, in which like reference numerals indicate identical or functionally similar elements:

FIG. 3A is a flow diagram showing a method for tracking ground engaging tool detections based on similarity scoring according to some embodiments of the disclosed technology.

FIG. 5A is a flow diagram showing a method for modeling the physical relationships between the three-dimensional positions of ground engaging tools according to some embodiments of the disclosed technology.

Figure 1A:
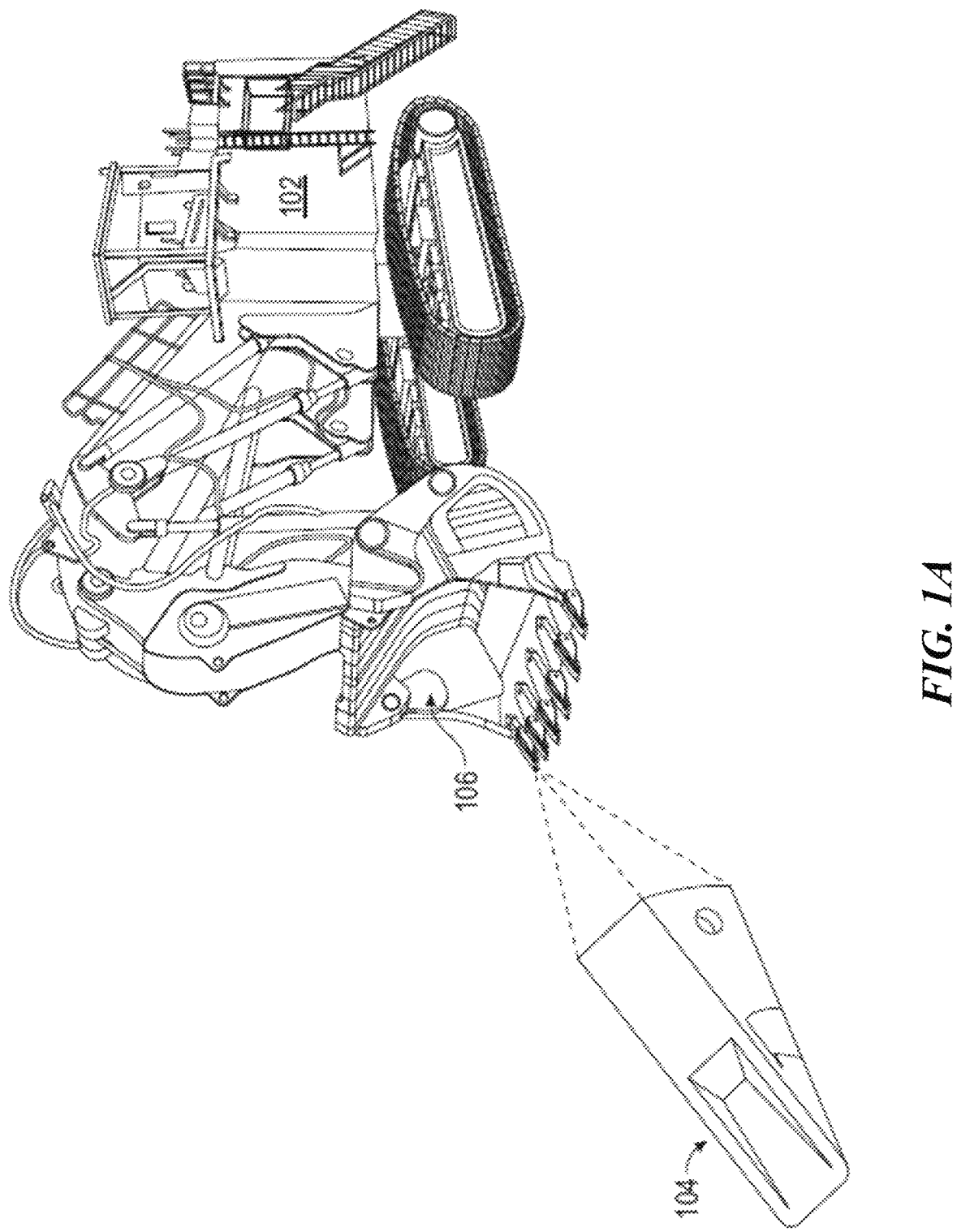
FIG. 1A illustrates a ground engaging tool on a bucket of a loading machine according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below to avoid unnecessarily obscuring the relevant description. The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for ground engaging tool (GET) loss detection. A GET monitoring system can receive image data from a camera(s) (e.g., infrared camera, stereo camera, or visible color camera) mounted on a machine. The image data can include image frames that include one or more GETs, such as bucket tips, lip shrouds, and/or side shrouds. The GET monitoring system can utilize a neural network to determine whether a GET is missing based on comparing consecutive images, depth measurements from the camera, or the distance relationships between multiple GETs. If a GET is determined to be missing from a bucket, the GET monitoring system can generate a notification to alert the operator or personnel at the site.

For each GET tracking technique, the GET monitoring information may collect different information during the calibration process. In a first example, columnar tracking requires that the GET monitoring system know which column of pixel space a GET is most likely to be in. In a second example, three-dimensional (3D) centroid-based tracking requires the GET monitoring system know the 3D space in which a GET is most likely to be in. In a third example, 3D relationship-based tracking requires the GET monitoring system know the 3D distance between each GET on the bucket. Due to the fact that the 3D distance between each GET remains constant during operation, the GET monitoring system can identify each GET using these known 3D relationships. The GET monitoring system can utilize the neural network to identify the class of GET, such as a bucket tip, a lip shroud, or a side shroud. Once each GET is identified, the GET monitoring system can identify the location of each GET on the bucket of the machine. For example, the GET monitoring system determines whether a bucket tip polygon, outputted by the neural network model, is bucket tip #1 or #2, etc.

Figure 1B:
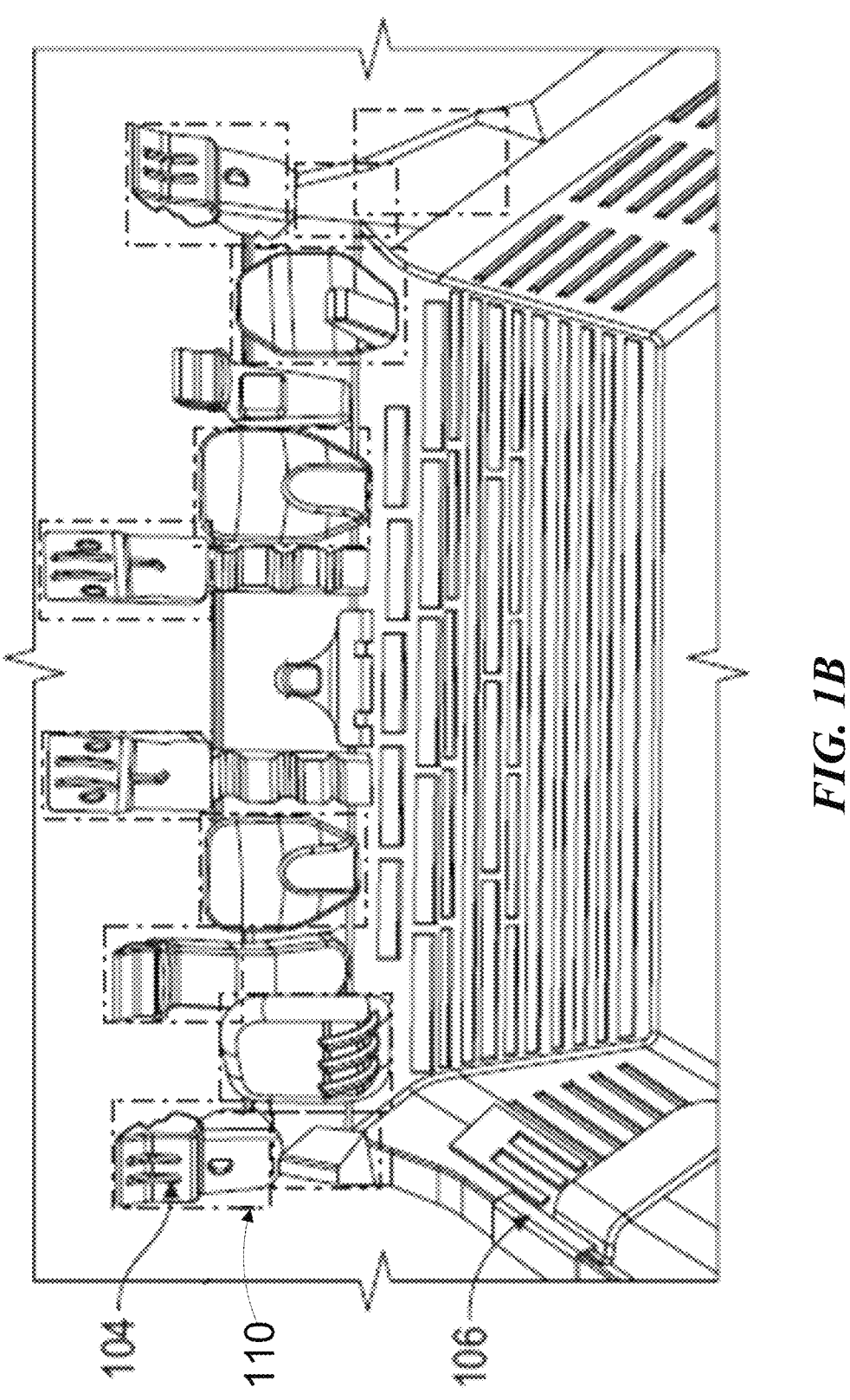
FIG. 1B illustrates a bucket of a loading machine with identified ground engaging tools according to some embodiments of the disclosed technology.

FIG. 1A illustrates a ground engagement tool on a bucket of a loading machine according to some embodiments of the disclosed technology. A ground engaging tool 104 (e.g., machine part, such as bucket tooth, lip shroud, or side shroud) is attached to a bucket 106 of a loading machine 102 (e.g., excavator). FIG. 1B illustrates a bucket 106 of a loading machine with ground engaging tools 104 included in polygons 110 according to some embodiments of the disclosed technology.

Figure 2A:
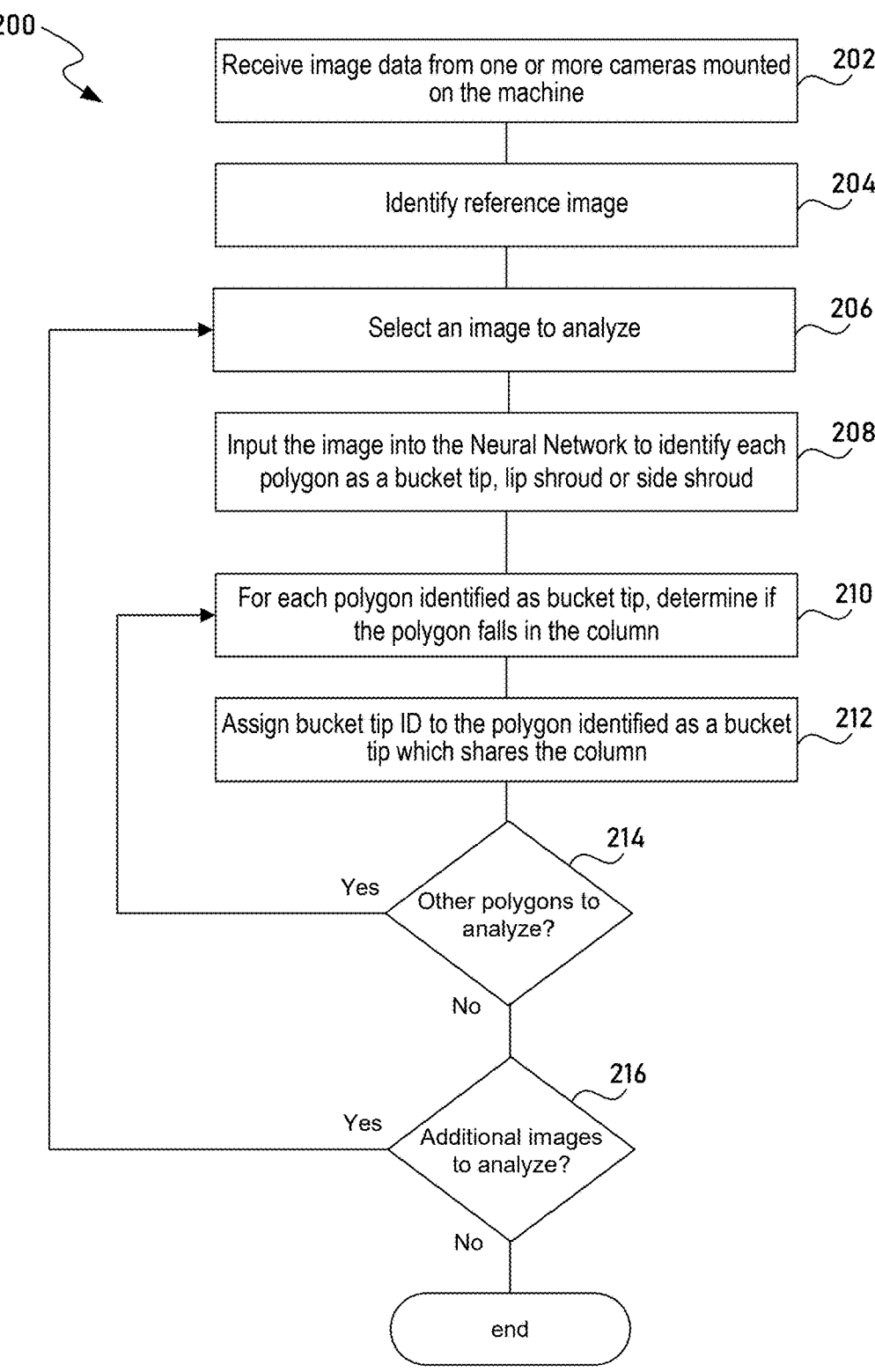
FIG. 2A is a flow diagram showing a method for tracking ground engaging tool detections by pixel column according to some embodiments of the disclosed technology.

FIG. 2A is a flow diagram showing a method 200 for tracking ground engaging tool detections by pixel column, according to some embodiments of the disclosed technology. The method 200 includes an algorithm for tracking detections of a GET by a GET monitoring system. The GET monitoring system can utilize columnar tracking to track GETs based on knowing which column of pixel space a GET is in.

During calibration, the GET monitoring system records the pixel space that a GET travels through. Due to the degrees of freedom (e.g., 2 degrees) of the GET in pixel space, this pixel space can be organized by columns, such as column 252 in FIG. 2B.

Figure 2B:
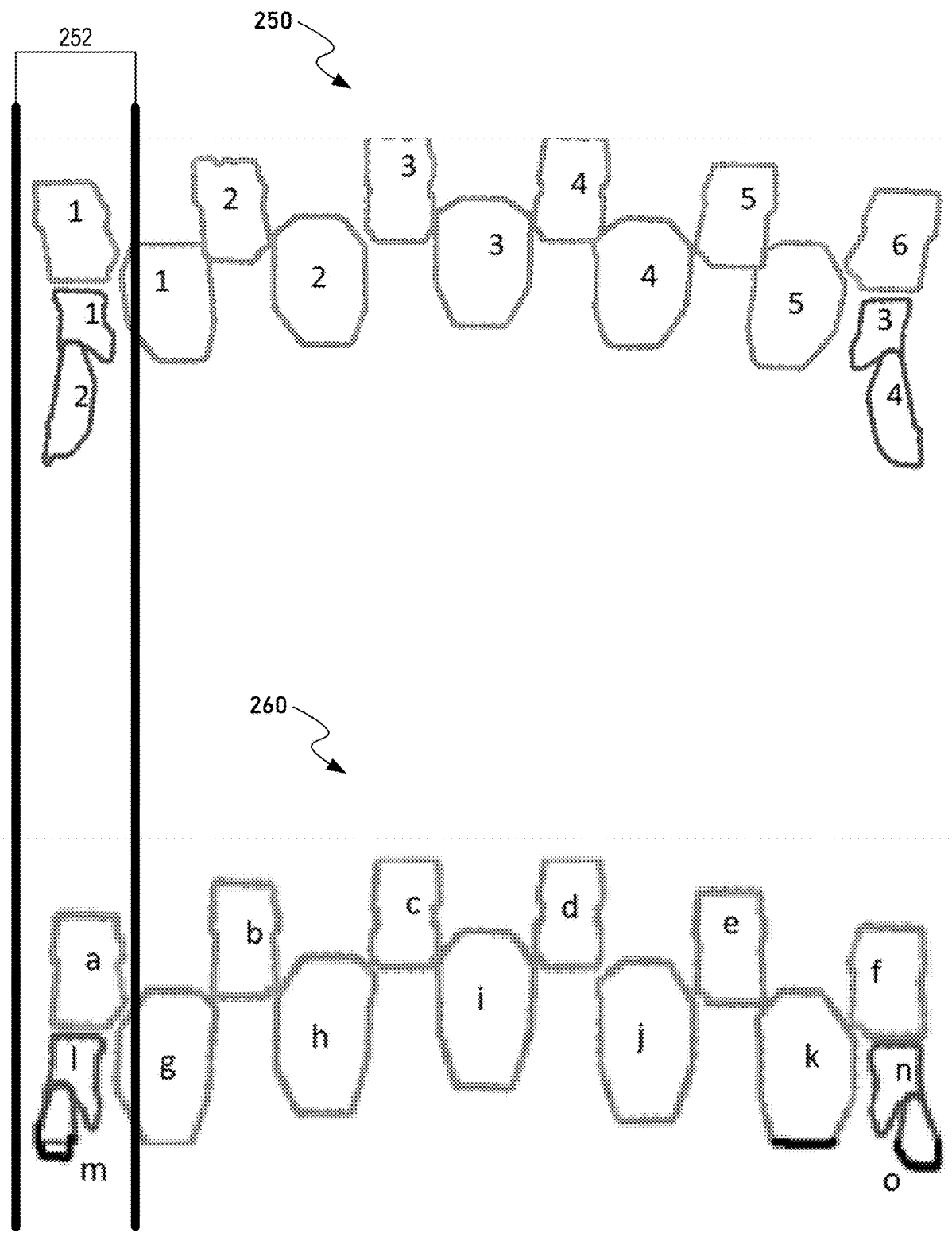
FIG. 2B illustrates polygons for columnar tracking of ground engaging tools according to some embodiments of the disclosed technology.

At step 202, the GET monitoring system receives image data from one or more cameras (e.g., visible color (RGB) imagers, stereo depth cameras, and infrared (IR) cameras) mounted on the machine. At step 204, the GET monitoring system can identify a reference image with identified GETs to compare other images to. FIG. 2B illustrates identified and labeled GETs in a reference image 250. In reference image 250, all the GETs are identified by bucket tip #1-#6, lip shroud #1-#5, side shroud #1-#4. are identified and polygons are drawn. At step 206, the GET monitoring system selects an image to analyze to identify GETs in the image. At step 208, the GET monitoring system inputs the image into the neural network model to identify each polygon as a bucket tip, lip shroud or side shroud. Image 260 of FIG. 2B illustrated identified polygons "a"-"o" by the neural network model.

At step 210, for each polygon identified as bucket tip, the GET monitoring system determines if the polygon falls in the pre-determined column (e.g., column 252 of FIG. 2B). At step 212, the GET monitoring system assigns a bucket tip ID to the polygon identified as a bucket tip which shares the column. For example, as show in FIG. 2B, bucket tip "a" falls in the same column 252 as bucket tip "#1", which results in the GET monitoring system determining that bucket tip "a" is the same as bucket tip "#1".

At step 214, the GET monitoring system determines if there are other polygons in the image, and if there are, performs steps 210-212 for the other polygons. For example, the GET monitoring system performs steps 210-212 for other bucket tips, lip shrouds, and/or side shrouds. At step 216, the GET monitoring system determines if there are other images to analyze and if there are performs steps 206-212 for the other images.

FIG. 3A is a flow diagram showing a method 300 for tracking ground engaging tool detections based on similarity scoring according to some embodiments of the disclosed technology. The method 300 includes an algorithm for tracking detections of a GET by a GET monitoring system. Method 300 can be used to track a GET over time with high accuracy by leveraging image pixel-space similarity scoring functions.

Figure 3B:
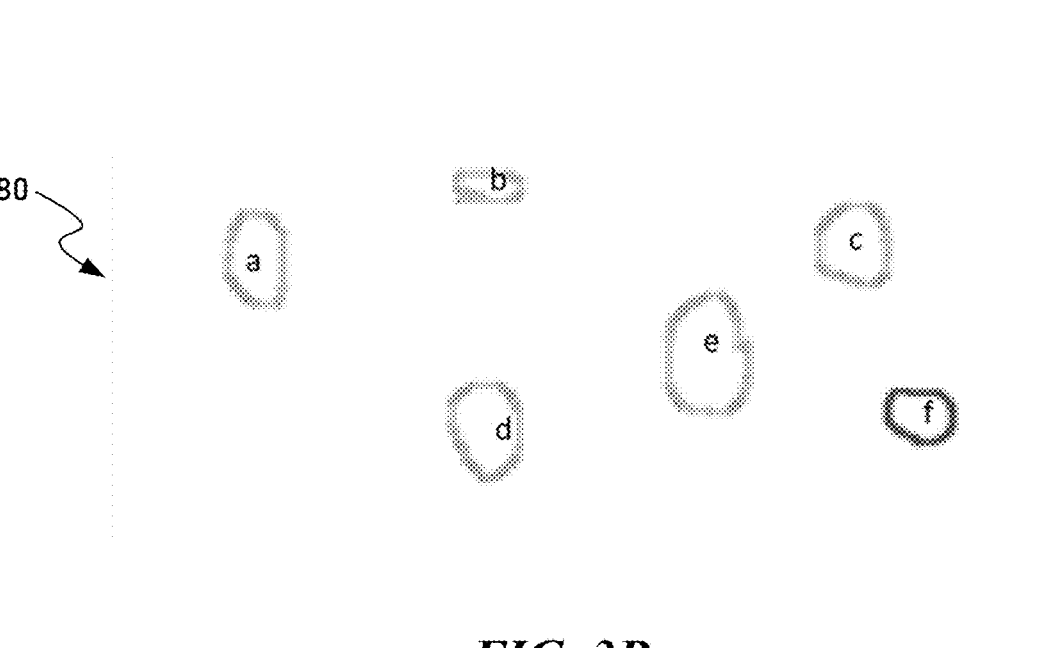
FIG. 3B illustrates polygons for similarity scoring of ground engaging tools according to some embodiments of the disclosed technology.

At step 302, the GET monitoring system receives image data from one or more cameras (e.g., visible color (RGB) imagers, stereo depth cameras, and infrared (IR) cameras) mounted on the machine. At step 304, the GET monitoring system can identify a reference image with identified GETs to compare other images to. In some cases, the reference image is the image received before the current image being analyzed. FIG. 3B illustrates identified and labeled GETs in a reference image 360. In reference image 360, all the GETs are identified by bucket tip #1-#6, lip shroud #1-#5, side shroud #1-#4. are identified and polygons are generated. At step 306, the GET monitoring system selects an image to analyze to identify GETs in the image. At step 308, the GET monitoring system inputs the image into the neural network model to identify each polygon as a bucket tip, lip shroud or side shroud. Images 370 and 380 of FIG. 3B illustrate identified polygons "a"-"o" by the neural network model.

At step 310, the GET monitoring system determines similarities between polygons in the image and GETs in the reference image. The GET monitoring system utilizes an algorithm (e.g., Intersection-over-Union or any similar scoring metric) to evaluate a similarity between detections of the GET in consecutive image frames (e.g., reference image and a following image). For example, for each GET that is detected in an image, the GET monitoring system calculates various similarity scores between the GETs in the image and the GETs in the previous image.

At step 312, the GET monitoring system assigns a similarity score to each GET. The chosen scoring metric is used to associate GET detections in different frames to each other so that the GET can be tracked across image frames over time. The scoring metric functions by measuring how much each detection in one frame overlaps with each detection in a rolling window of previous frames. If a detection does not overlap with another detection, a distance metric (or a value derived from a distance metric, such as a negative distance) between the detection centroids (e.g., center of polygons 110 of FIG. 1B) are used as a surrogate. For each polygon identified as a bucket tip, the GET monitoring system checks the similarity (e.g., based on Intersection of Union (IoU), pixel overlap, etc.) between a polygon and every known bucket tip in the reference image 360.

After various combinations of image frames are scored, at step 314, the GET monitoring system selects the polygon with the highest similarity score. For example, the bucket tip in the images 370 or 380 will receive the identifier of the bucket tip in the reference image 360 with which it shares the highest similarity score. For example, bucket tip "a" of image 370 and 380 overlaps the greatest with bucket tip "#1" of reference image 360, which results in the GET monitoring system determining that bucket tip "a" is the same as bucket tip "#1".

The GET monitoring system can determine which GET is in each image based on the similarity scoring. The scoring process can occur iteratively, starting with the highest scoring match. When a GET detection in the current frame is associated to a GET(s) in previous frames, those GET(s) in previous frames are removed as possible matches for other GET(s) in the current frame. This iterative process prevents multiple GETs in the current frame from matching to the same GET in any previous frames. The algorithm can also use image frames saved during calibration and respective GET detections to improve tracking and association.

In some implementations, the GET monitoring system can improve the accuracy of the GET tracking algorithm. For example, the GET of a loading machine moves through 2 degrees of freedom with respect to a camera mounting position on a stick (e.g., vertical stick motion and bucket rotation) of the loading machine stick. These constraints on possible motion of the GET implies every GET is approximately contained within discrete columns (in pixel-space) of an image captured through the camera mounted on a fixed point of the stick of the loading machine. The physical constraints of the motion of the GET are utilized by stretching bounding boxes (e.g., polygons 110 of FIG. 1B) of the GET detections in previous image frames such that the bounding boxes extend to a top and bottom of an image. Further, similarity scores between current and previous GET detections are computed during the tracking and association process. The stretching of the previous detection bounding boxes acts as a constraint during a matching process that increases a chance of current frame GET detections being associated with a GET identifier (ID) of previous detections that is approximately the same pixel-space column in the image.

At step 316, the GET monitoring system determines if there are other polygons in the image and if there are performs steps 310-314 for the other polygons. At step 318, the GET monitoring system determines if there are other images to analyze, and if there are performs steps 306-314 for the other images.

Figure 4:
FIG. 4 is a flow diagram showing a method for tracking subclasses of a ground engaging tool according to some embodiments of the disclosed technology.

FIG. 4 is a flow diagram showing a method 400 for tracking subclasses of a ground engaging tool according to some embodiments of the disclosed technology. The GET monitoring system can track subclasses of a GET in 3D using cameras (IR, stereo, or RGB cameras).

The GET monitoring system tracks the GETs over time by projecting the GET detections into 3D using stereo camera disparity and are associated based on the 3D position of the GET. The GET monitoring system assigns GET IDs during the calibration process. At step 402, during calibration, the GET monitoring system records the XYZ range in which each GET appears relative to the other GETs in an image. An example of this data is that the centroid of bucket tip #3 lies between 1.5m and 1.3m on the left side from the center of the camera, at a distance between 2m and 2.5 from the camera.

At step 404, the GET monitoring system receives an image and inputs the image into the neural network model. At step 406, the GET monitoring system calculates the centroid of each GET detected by the neural network model. The neural network model identifies each polygon, such as a bucket tip, lip shroud, or side shroud. The GET monitoring system can project the centroid (e.g., center of polygons 110 of FIG. 1B) of each GET's segmentation mask into 3D using the stereo camera disparity and camera intrinsic. After projecting each GET's centroid into 3D, the GET monitoring system saves the YZ plane that the GET lies in.

At step 408, the GET IDs are assigned using the predetermined XYZ ranges recorded in Step 402. For example, if bucket tip "a", lies in the known XYZ range of bucket tip #1, then bucket tip "a" must be bucket tip "#1". As another example, if the GET Monitoring System identifies a bucket tip with a centroid that appears in the range of 1.5m and 1.3m on the left side of the center of the camera and at a distance of 2-2.5m from the camera, then this must be bucket tip #3 as that is the known XYZ range for that GET.

At step 410, the GET monitoring system determines if there are other polygons in the image frame and performs steps 406-408 for the other polygons associated with GETs. At step 412, the GET monitoring system determines if there are other images to analyze and performs steps 404-408 on any additional images. Method 400 improves tracking performance by tracking certain types of GET in a 3D space where the GETs are separated, altogether avoiding the perspective distortion that is encountered when tracking a GET in image pixel-space. Error checking is used to invalidate unlikely associations iteratively until the predetermined tracking results are achieved. Error checking is done by searching for out of order GET IDs that should not be possible, then rerunning the association process while explicitly invalidating the impossible matches that were previously made. This process is repeated until the association converges on a set of associations that yield GET IDs that make physical sense. For example, if GET IDs are ordered with increasing IDs from left to right at calibration time, any out of order IDs are known to be physically impossible and must be due to an error during the tracking and association process.

FIG. 5A is a flow diagram showing a method 500 for modeling the physical relationships between the three-dimensional positions of ground engaging tools according to some embodiments of the disclosed technology. The GET monitoring system can model the physical relationships between the 3D positions of GETs using stereo camera disparity to improve tracking of GETs, error checking, and GET occlusion detection.

Figure 6A:
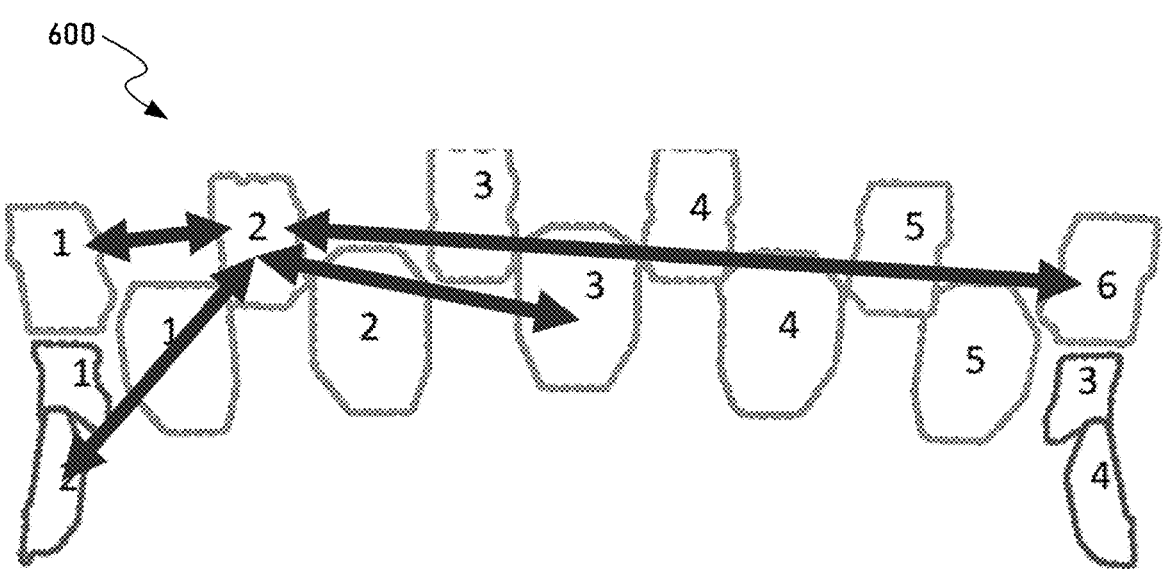
FIG. 6A illustrates identified polygons on ground engaging tools with distance markers according to some embodiments of the disclosed technology.

The GET monitoring system receives image data from one or more cameras (e.g., visible color (RGB) imagers, stereo depth cameras, and infrared (IR) cameras) mounted on the machine. At step 502, during calibration, the GET monitoring system records the 3D distances between a GET's 3D centroid and the other GETs' 3D centroids and stores it in a database. For example, image 600 of FIG. 6A illustrates, the 3D distance between bucket tip #2 and tip #1, tip #6, lip #3, side #2 are recorded. At 504, the GET monitoring system inputs an image into the neural network.

At step 506, the GET monitoring system calculates the 3D centroid for a polygon of a GET detected by the neural network. The GET monitoring system can compute and project the centroids (e.g., center of polygons 110 of FIG. 1B or the center of polygon 556 of FIG. 5B) of each GET's segmentation masks into 3D.

Figure 6B:
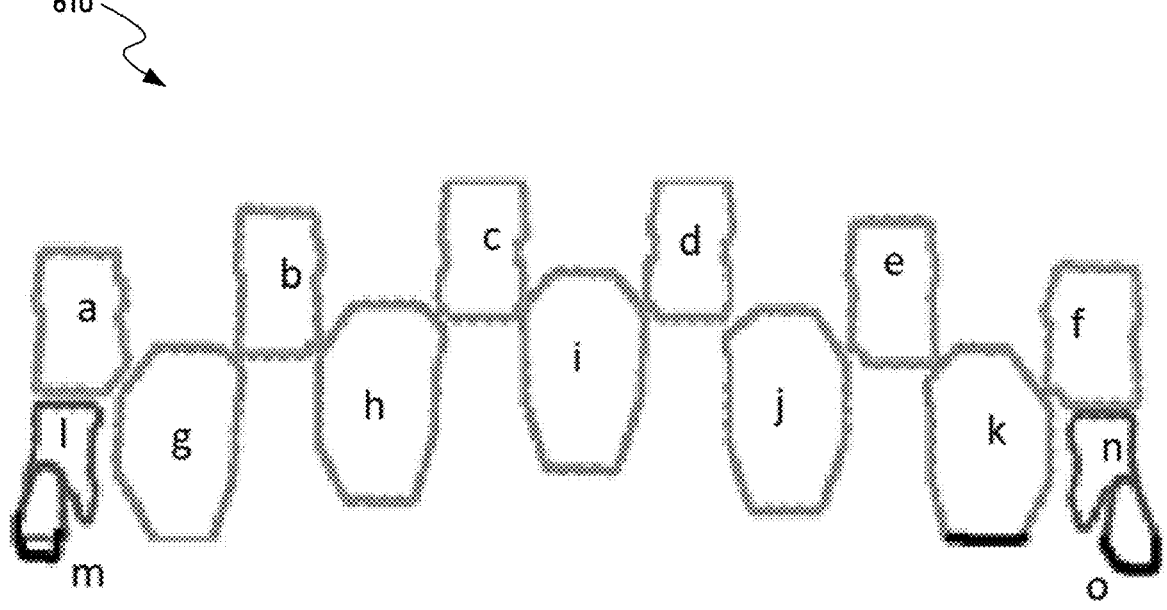
FIG. 6B illustrates polygons on ground engaging tools on a bucket of a machine according to some embodiments of the disclosed technology.

At step 508, the GET monitoring system calculates, for each 3D centroid, the 3D distances between other 3D centroids. After being projected into 3D, the 3D vectors that connect these centroids for each combination of all GETs are computed. 3D relationship vectors are computed for all GET combinations, including for different combinations of different GET classes (e.g., between a lip-shroud and a side-shroud or a bucket tip and a lip-shroud). During normal system operation, these 3D relationship vectors can be used for multiple purposes. For example, the GET monitoring system determines the distances (e.g., between centroids of the GETs) between all combinations of bucket tips, lip shrouds, and side-shrouds. Since the distance between GETs remain constant, each distance can be looked up in the database. The calculated values can be compared to the recorded values during calibration to find a GET's centroid that matches the 3D distance relationships. For example, as shown in image 600 FIG. 6A and image 610 of FIG. 6B, if bucket tip "b" has the same distance relationship with tip #1, tip #6, lip #3 and side #2 as tip #2 had during calibration, then bucket tip "b" must be bucket tip "#2".

After association/tracking of bucket tips, lip-shrouds, and side shrouds is performed, the GET monitoring system determines bucket rotation between consecutive frames using iterative closest point (ICP) or similar point cloud processing methods on GET point clouds. Once bucket rotation is determined, the GET monitoring system can track side-shrouds by checking where a side shroud is expected to be seen in 3D space. For example, by using the bucket rotation in conjunction with the 3D position of nearby bucket tips and lip-shrouds detections, and predetermined 3D relationship models to each side-shroud. The GET monitoring system can project the centroids of side-shroud detections in the current frame into 3D and associate to the nearest expected side shroud position based on a distance metric.

Figure 5B:
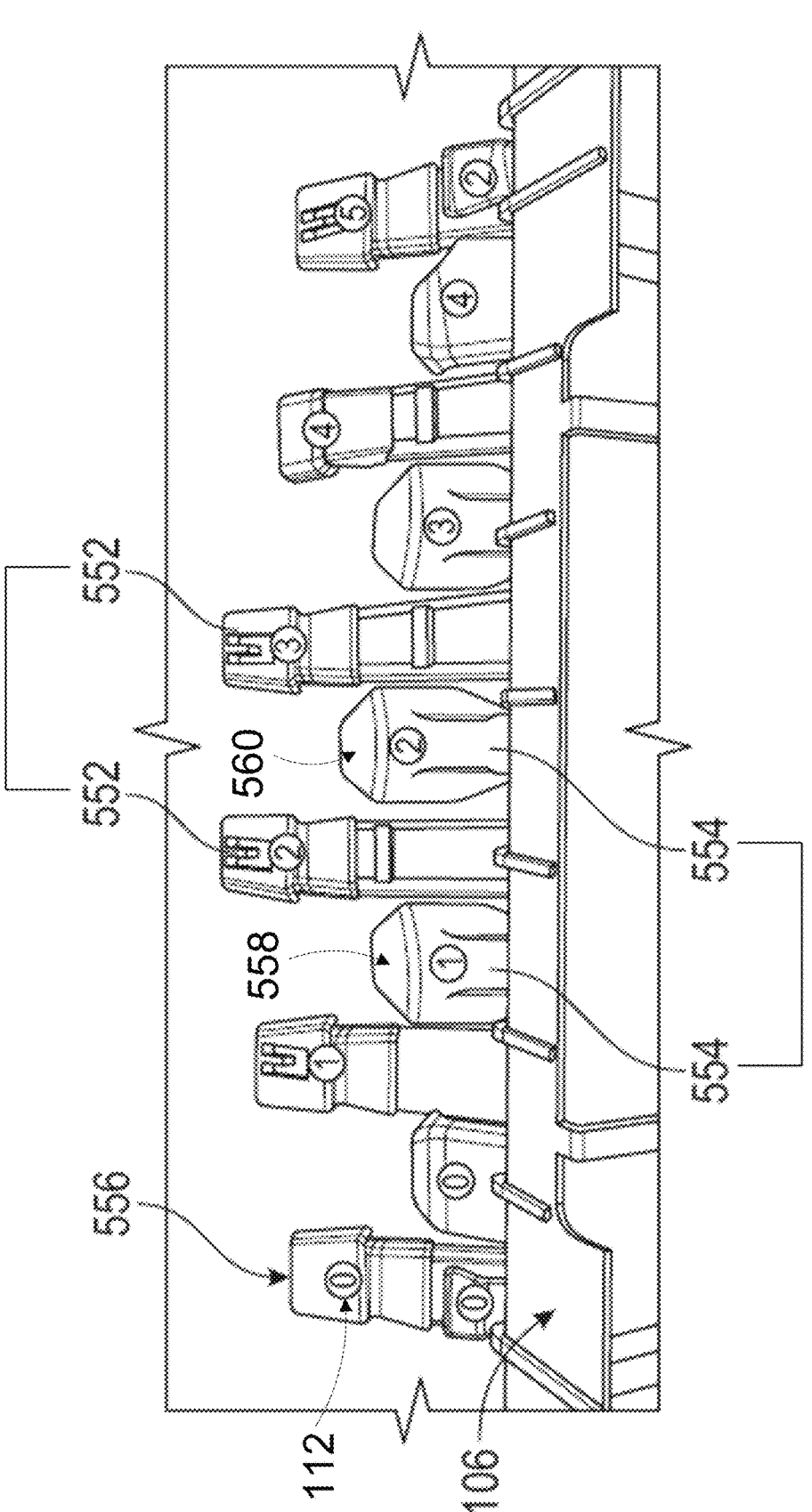
FIG. 5B illustrates identified ground engaging tools on a bucket of a machine according to some embodiments of the disclosed technology.

The GET monitoring system can perform error checking of associations/tracking using the 3D relationships (of step 506 and 508). For each association in the current frame, other nearby GET ID associations can be checked for correctness by verifying that detections of GETs were in the expected position based on the rotated GET IDs 3D relationship models. FIG. 5B illustrates a bucket 106 with bucket tips and lip shrouds, and identifiers 112 on the bucket tips and lip shrouds. In a first example, the distance 552 between bucket tip 2 and bucket tip 3 is determined so that once bucket tip 2 is identified, the GET monitoring system knows where bucket tip 3 should be located. If bucket tip 3 is not at the expected location (e.g., not detected or above/below a threshold distance from the bucket tip 2), the GET monitoring system can determine whether bucket tip 3 is occluded from the camera view or is missing. In a second example, the distance 554 between lip shroud 1 and lip shroud 2 is determined so that once lip shroud 1 is identified, the GET monitoring system knows where lip shroud 2 should be located. If lip shroud 2 is not at the expected location, the GET monitoring system can determine whether lip shroud 2 is occluded from the camera view or is missing. In some implementations, if the distance between two GETs does not equal the predetermined distance, the GET monitoring system determines one or more GETs are missing from the bucket.

At step 510, the GET monitoring system determines if that GET is occluded (e.g., by dirt, or debris) by checking if the GET's expected position, based on its neighboring GET's 3D relationship vectors, violates a depth (i.e., z) constraint. At step 512, the GET monitoring system can identify the state of the GET based on a depth threshold. If the average depth of the point specified by all nearby associated GET's 3D relationship vectors is closer than expected, then something (e.g., dirt) is occluding the GET from the view of the camera. In a first example, if the depth (e.g., distance of the GET from the camera) of the GET below a threshold distance, the GET monitoring system can conclude that dirt or debris is between the GET and the camera. In a second example, if the depth (e.g., distance of the GET from the camera) of the GET is above a threshold distance, the GET monitoring system can conclude that the GET is missing.

At step 514, the GET monitoring system generates a notification if a GET is detected missing. The GET monitoring system can send the notification to the operator of the machine to alert the operator that a GET is missing. In some implementations, the GET monitoring system remotely (e.g., via a command signal) powers down the machine when a GET is detected missing. The GET monitoring system can power down other machines (e.g., a crusher machine) at a site if a GET is detected missing on a machine.

Method 500 improves tracking performance of side shrouds, lip shrouds, and bucket tips by being able to track them in 3D. Additionally, method 500 improves tracking error checking and detection of occlusions for all GETs by being able to check that associations make physical sense based on many different modeled relationships. The GET monitoring system can repeat steps 504-514 on any received image data.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 7:
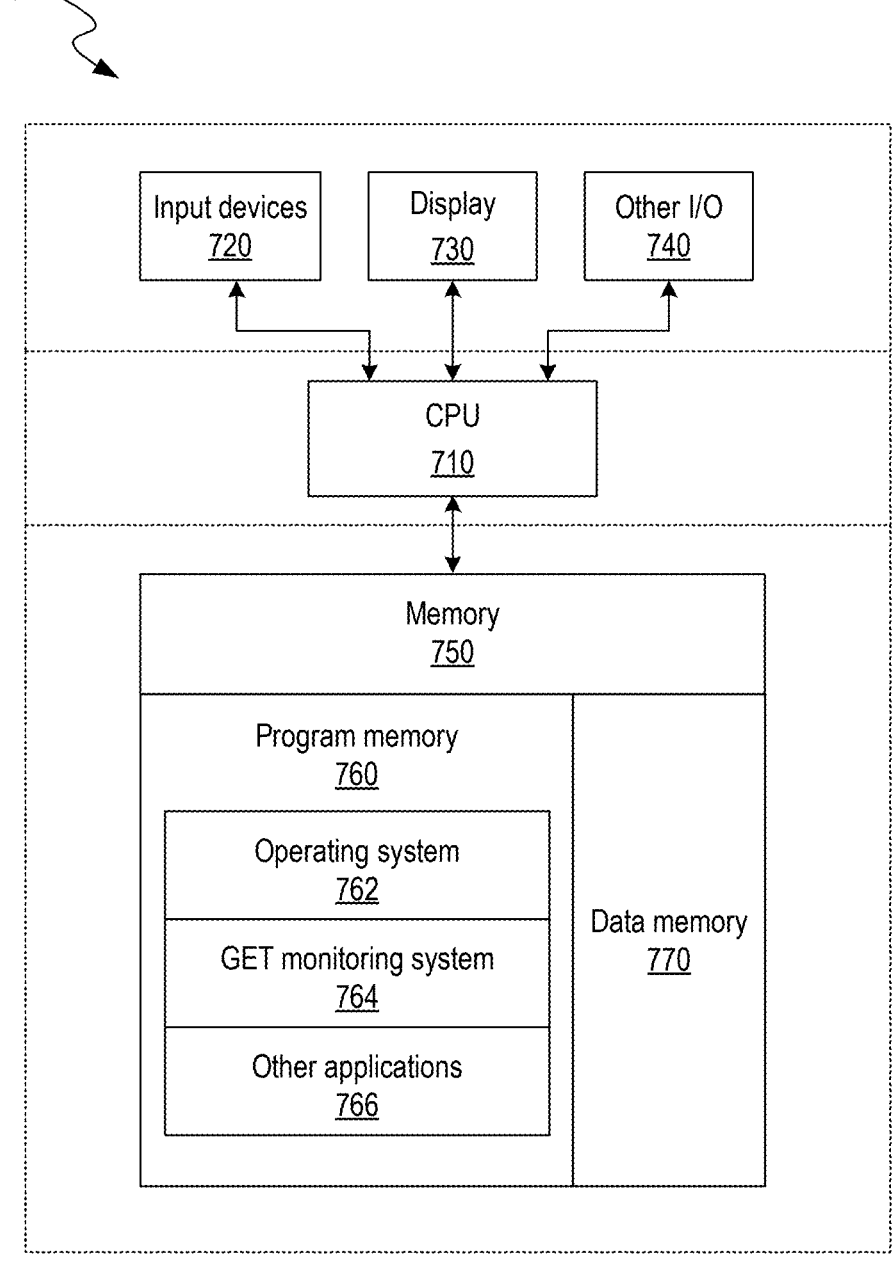
FIG. 7 is a block diagram illustrating an overview of devices on which some implementations can operate.

Several implementations are discussed below in more detail in reference to the figures. FIG. 7 is a block diagram illustrating an overview of devices on which some implementations of the disclosed technology can operate. The devices can comprise hardware components of a device 700 that performs wear assessment and part replacement timing optimization, for example. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, GET monitoring system 764, and other application programs 766. Memory 750 can also include data memory 770 that can include database information, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 8:
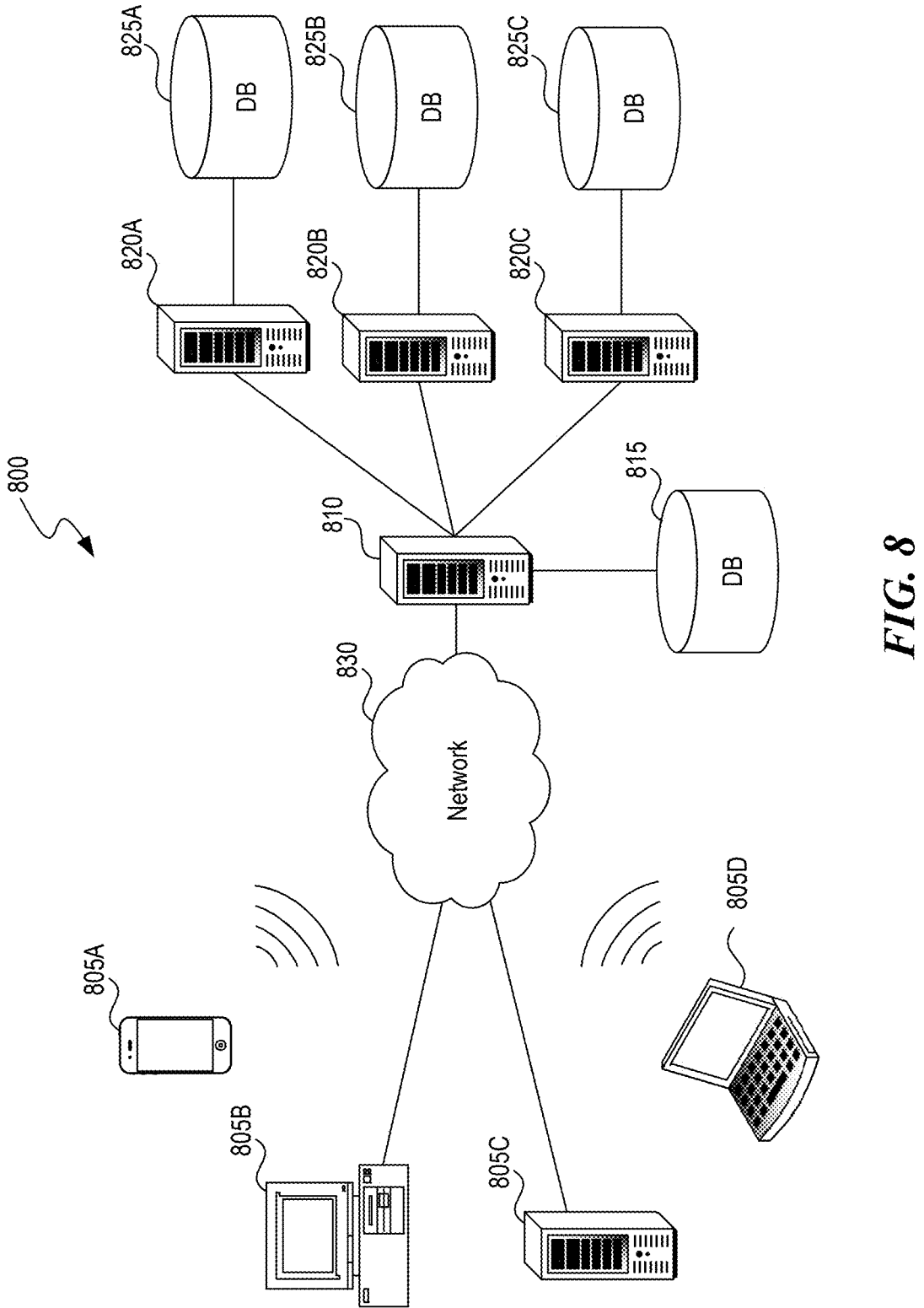
FIG. 8 is a block diagram illustrating an overview of an environment in which some implementations can operate.

FIG. 8 is a block diagram illustrating an overview of an environment 800 in which some implementations of the disclosed technology can operate. Environment 800 can include one or more client computing devices 805A-D, examples of which can include device 700. Client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 9:
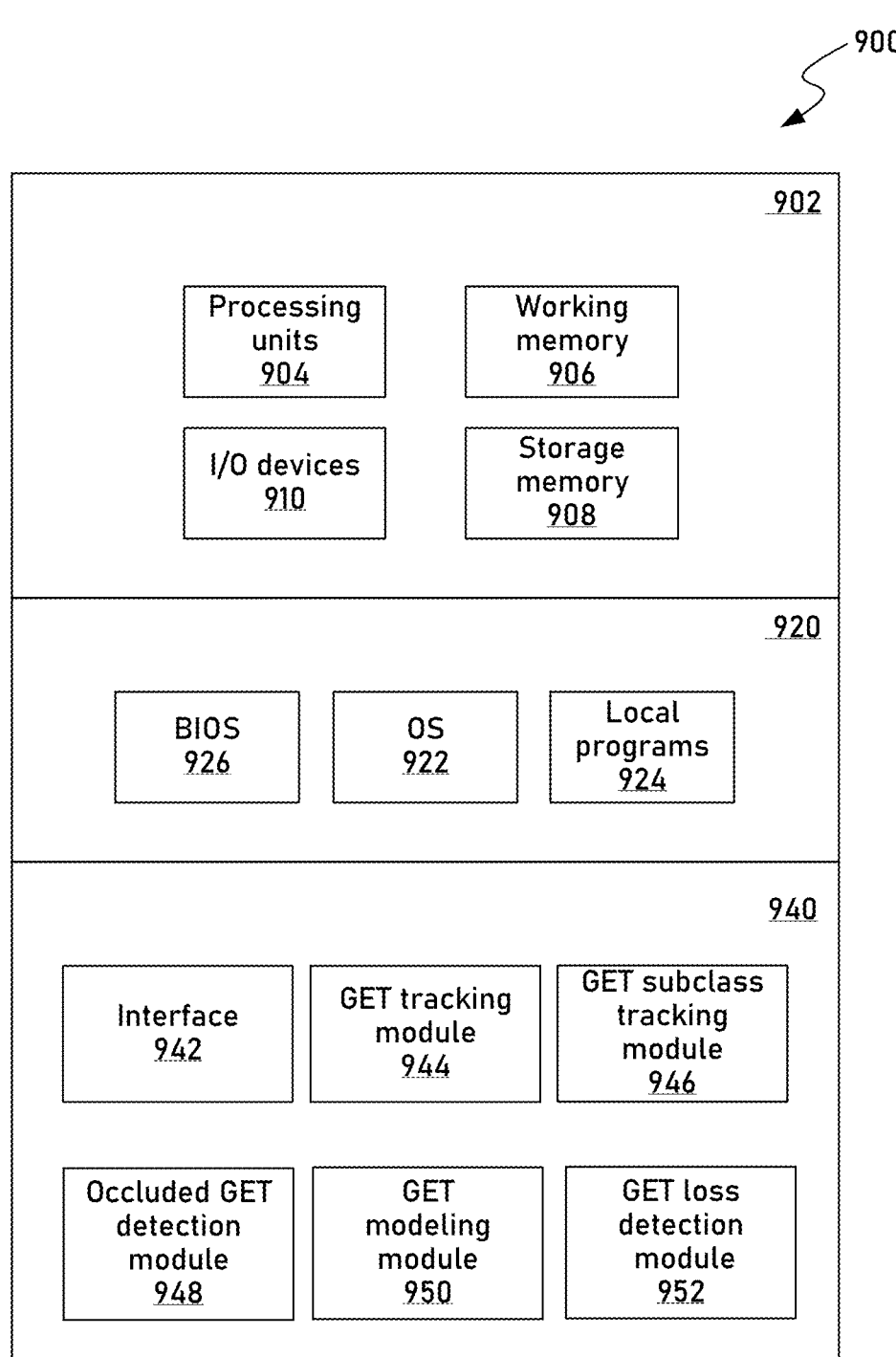
FIG. 9 is a block diagram illustrating components which, in some implementations, can be used in a system employing the disclosed technology.

FIG. 9 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include a GET tracking module 944 (e.g., configured to perform one or more steps of methods 200, 300, 400, and/or 500), a GET subclass tracking module 946 (e.g., configured to perform one or more steps of methods 200, 300, 400, and/or 500), an occluded GET detection module 948 (e.g., configured to perform one or more steps of methods 200, 300, 400, and/or 500), a GET modeling module 950 (e.g., configured to perform one or more steps of methods 200, 300, 400, and/or 500), a GET loss detection module 952 (e.g., configured to perform one or more steps of methods 200, 300, 400, and/or 500) and components that can be used for transferring data and controlling the specialized components, such as interface 942. In some implementations, components 900 can be in a computing system that is distributed across multiple computing devices or can be an interface to a server-based application executing one or more of specialized components 940.

Those skilled in the art will appreciate that the components illustrated in FIGS. 7-9 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

A GET monitoring system can receive image data from a camera(s) (e.g., infrared camera, stereo camera, or visible color camera) mounted on a machine. The image data can include image frames that include one or more GETs, such as bucket tips, lip shrouds, and/or side shrouds. The GET monitoring system can utilize a neural network to determine whether a GET is missing based on comparing consecutive images, depth measurements from the camera, or the distance relationships between multiple GETs. If a GET is determined to be missing from a bucket, the GET monitoring system can generate a notification to alert the operator or personnel at the site. The present systems and methods can be implemented to manage and control maintenance of multiple industrial machines, vehicles and/or other suitable devices such as mining machines, trucks, corporate fleets, etc.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Unless explicitly excluded, the use of the singular to describe a component, structure, or operation does not exclude the use of plural such components, structures, or operations. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, the expression "at least one of A, B, and C" is intended to cover all permutations of A, B and C. For example, that expression covers the presentation of at least one A, the presentation of at least one B, the presentation of at least one C, the presentation of at least one A and at least one B, the presentation of at least one A and at least one C, the presentation of at least one B and at least one C, and the presentation of at least one A and at least one B and at least one C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

What is claimed is:

1. A method for ground engaging tool loss detection, the method comprising:

receiving, from at least one camera, at least one image of a first ground engaging tool and a second ground engaging tool attached to a first work machine at a worksite;

inputting the at least one image into a neural network model to detect if the first ground engaging tool or the second ground engaging tool is missing, by:

generating by the neural network model, a first segmentation mask around the first ground engaging tool and a second segmentation mask around the second ground engaging tool in the at least one image;

determining, by the neural network model, a first centroid of the first segmentation mask and a second centroid of the second segmentation mask;

calculating, by the neural network model, a distance from the first centroid of the first ground engaging tool to the second centroid of the second ground engaging tool; and in response to the distance not equaling a predetermined value, determining, by the neural network model, the second ground engaging tool is missing on the first work machine; and in response to determining the second ground engaging tool is missing, sending a command to power down the first work machine or a second work machine at the worksite, wherein the second work machine is different than the first work machine.

2. The method of claim 1, further comprising:

generating a notification that the second ground engaging tool is missing, wherein the notification alerts an operator of the first work machine to power down the first work machine.

3. The method of claim 1, further comprising:

receiving, from the at least one camera, a plurality of image frames that include the first ground engaging tool;

determining at least one similarity in two or more of the plurality of image frames; and assigning a similarity score based on a measurement of how much at least one detection of the first ground engaging tool in one frame overlaps with at least one detection of the first ground engaging tool in two or more previous frames, wherein the at least one camera is an infrared camera, a stereo depth camera, or a visible color imager, wherein the similarity score is used to identify the first ground engaging tool.

4. The method of claim 1, further comprising:

training the neural network model to detect occluded ground engaging tools in images based on a plurality of images that include annotated occluded ground engaging tools;

inputting the at least one image into the trained neural network model; and determining a third ground engaging tool is occluded from the at least one image.

5. The method of claim 1, further comprising:

determining the second ground engaging tool is occluded from the at least one image based on a depth metric associated with the second ground engaging tool being below a threshold.

6. The method of claim 1, further comprising:

determining the second ground engaging tool is missing from the at least one image based on a depth metric associated with the second ground engaging tool being above a threshold.

7. The method of claim 1, further comprising:

recording a first XYZ range in which the first ground engaging tool appears relative to one or more ground engaging tools in the at least one image;

inputting a second image into the neural network model;

calculating at least one centroid for at least one ground engaging tool detected by the neural network model in the second image; and identifying the at least one ground engaging tool as the first ground engaging tool based on a second XYZ range from the at least one centroid one or more ground engaging tools in the second image matching the first XYZ range associated with the first ground engaging tool.

8. The method of claim 1, further comprising:

identifying the first ground engaging tool in the at least one image based on a column of pixel space the first ground engaging tool is in.

9. A non-transitory computer-readable medium storing instructions that, when executed by a computing system, cause the computing system to perform operations for ground engaging tool loss detection, the operations comprising:

receiving, from at least one camera, at least one image of a first ground engaging tool and a second ground engaging tool attached to a first work machine at a worksite;

inputting the at least one image into a neural network model to detect if the first ground engaging tool or the second ground engaging tool is missing by:

generating, by the neural network model, a first segmentation mask around the first ground engaging tool and a second segmentation mask around the second ground engaging tool in the at least one image;

determining, by the neural network model, a first centroid of the first segmentation mask and a second centroid of the second segmentation mask;

calculating, by the neural network model, a distance from the first centroid of the first ground engaging tool to the second centroid of the second ground engaging tool; and in response to the distance not equaling a predetermined value, determining, by the neural network model, the second ground engaging tool is missing on the first work machine; and in response to determining the second ground engaging tool is missing sending a command to power down the first work machine or a second work machine at the worksite, wherein the second work machine is different than the first work machine.

10. The non-transitory computer-readable medium of claim 9, wherein the operations further comprise:

generating a notification that the second ground engaging tool is missing, wherein the notification alerts an operator of the first work machine to power down the first work machine.

11. The non-transitory computer-readable medium of claim 9, wherein the operations further comprise:

receiving, from the at least one camera, a plurality of image frames that include the first ground engaging tool;

determining at least one similarity in two or more of the plurality of image frames; and assigning a similarity score based on a measurement of how much at least one detection of the first ground engaging tool in one frame overlaps with at least one detection of the first ground engaging tool in two or more previous frames, wherein the at least one camera is an infrared camera, a stereo depth camera, or a visible color imager.

12. The non-transitory computer-readable medium of claim 9, wherein the operations further comprise:

training the neural network model to detect occluded ground engaging tools in images based on a plurality of images that include annotated occluded ground engaging tools;

inputting the at least one image into the trained neural network model; and determining a third ground engaging tool is occluded from the at least one image.

13. The non-transitory computer-readable medium of claim 9, wherein the operations further comprise:

determining the second ground engaging tool is occluded from the at least one image based on a depth metric associated with the second ground engaging tool being below a threshold.

14. The non-transitory computer-readable medium of claim 9, wherein the operations further comprise:

determining the second ground engaging tool is missing from the at least one image based on a depth metric associated with the second ground engaging tool being above a threshold.

15. The non-transitory computer-readable medium of claim 9, wherein the operations further comprise:

recording a first XYZ range in which the first ground engaging tool appears relative to one or more ground engaging tools in the at least one image;

inputting a second image into the neural network model;

calculating at least one centroid for at least one ground engaging tool detected by the neural network model in the second image; and identifying the at least one ground engaging tool as the first ground engaging tool based on a second XYZ range from the at least one centroid to other ground engaging tools in the second image matching the first XYZ range associated with the first ground engaging tool.

16. A system comprising:

one or more processors; and one or more memories storing instructions that, when executed by the one or more processors, cause the system to perform a process for ground engaging tool loss detection, the process comprising:

receiving, from at least one camera, at least one image of a first ground engaging tool and a second ground engaging tool attached to a first work machine at a worksite;

inputting the at least one image into a neural network model to detect if the first ground engaging tool or the second ground engaging tool is missing, by:

generating, by the neural network model, a first segmentation mask around the first ground engaging tool and a second segmentation mask around the second ground engaging tool in the at least one image;

determining by the neural network model, a first centroid of the first segmentation mask and a second centroid of the second segmentation mask;

calculating, by the neural network model, a distance from the first centroid of the first ground engaging tool to the second centroid of the second ground engaging tool; and in response to the distance not equaling a predetermined value, determining, by the neural network model, the second ground engaging tool is missing on the first work machine; and in response to determining the second ground engaging tool is missing, sending a command to power down the first work machine or a second work machine at the worksite, wherein the second work machine is different than the first work machine.

17. The system according to claim 16, wherein the process further comprises:

generating a notification that the second ground engaging tool is missing, wherein the notification alerts an operator of the first work machine to power down the first work machine.

18. The system according to claim 16, wherein the process further comprises:

receiving, from the at least one camera, a plurality of image frames that include the first ground engaging tool;

determining at least one similarity in two or more of the plurality of image frames; and assigning a similarity score based on a measurement of how much at least one detection of the first ground engaging tool in one frame overlaps with at least one detection of the first ground engaging tool in two or more previous frames, wherein the at least one camera is an infrared camera, a stereo depth camera, or a visible color imager.

19. The system according to claim 16, wherein the process further comprises:

training the neural network model to detect occluded ground engaging tools in images based on a plurality of images that include annotated occluded ground engaging tools;

inputting the at least one image into the trained neural network model; and determining a third ground engaging tool is occluded from the at least one image.

20. The system according to claim 16, wherein the process further comprises:

determining the second ground engaging tool is occluded from the at least one image based on a depth metric associated with the second ground engaging tool being below a threshold.

* * * * *